United States Patent
Proctor, Jr.

(10) Patent No.: US 6,456,835 B1
(45) Date of Patent: Sep. 24, 2002

(54) ARBITRATION METHOD FOR HIGH POWER TRANSMISSIONS IN A CODE DIVISION MULTIPLE ACCESS SYSTEM

(75) Inventor: James A. Proctor, Jr., Indialantic, FL (US)

(73) Assignee: Tantivy Communications, Inc., Melbourne, FL (US)

( * ) Notice: Subject to any disclaimer, the term of this patent is extended or adjusted under 35 U.S.C. 154(b) by 0 days.

(21) Appl. No.: 09/482,241

(22) Filed: Jan. 13, 2000

Related U.S. Application Data

(60) Provisional application No. 60/116,292, filed on Jan. 19, 1999.

(51) Int. Cl.[7] .................................................. H04B 1/10
(52) U.S. Cl. ...................... 455/296; 455/67.1; 455/421; 370/342
(58) Field of Search .................................. 455/421, 422, 455/423, 425, 427, 12.1, 296, 67.1, 67.3, 67.7, 88, 128, 226.1, 226.2, 226.3, 226.4, 436; 370/320, 331, 332, 335, 342, 441, 908

(56) References Cited

U.S. PATENT DOCUMENTS

| | | | |
|---|---|---|---|
| 4,675,656 A | * | 6/1987 | Narcisse ...................... 455/88 |
| 5,373,548 A | * | 12/1994 | McCarthy ..................... 455/421 |
| 5,768,696 A | * | 6/1998 | Law ............................. 455/128 |
| 5,809,414 A | * | 9/1998 | Coverdale et al. ........... 455/421 |
| 5,867,782 A | * | 2/1999 | Yoon ............................ 455/421 |
| 6,091,716 A | * | 7/2000 | Gorday et al. ............... 455/421 |
| 6,219,540 B1 | * | 4/2001 | Besharat et al. ............. 455/421 |

FOREIGN PATENT DOCUMENTS

| | | | |
|---|---|---|---|
| EP | 631 397 A2 | 12/1994 | |
| EP | 737 020 A2 | 10/1996 | |
| JP | 3-182129 A | * 8/1991 | ............ H04B/7/26 |
| WO | WO 97/46041 | 12/1997 | |

* cited by examiner

Primary Examiner—Nay Maung
Assistant Examiner—Quochien B. Vuong
(74) Attorney, Agent, or Firm—Hamilton, Brook, Smith & Reynolds, P.C.

(57) ABSTRACT

In an interference mitigation method, subscribers that will receive a high power transmission generate an alert message to surrounding base stations. A surrounding base station, before it generates new transmissions, determines the distance between it and a second subscriber that will receive the new transmission. If the distance is greater than an interference threshold, the base station delays the new transmission until the first high-power transmission concludes. The method prevents two high-power transmissions from occurring simultaneously.

20 Claims, 3 Drawing Sheets

ARBITRATION METHOD FOR HIGH POWER TRANSMISSIONS IN A CODE DIVISION MULTIPLE ACCESS SYSTEM

CROSS REFERENCE TO RELATED APPLICATIONS

This application claims the benefit of a prior co-pending U.S. provisional application, Ser. No. 60/116,292 filed Jan. 19, 1999, the entire teachings of which are incorporated herein.

BACKGROUND

The present invention relates to interference control techniques in Code Division Multiple Access ("CDMA") communication systems.

CDMA systems transmit a plurality of different information signals to receivers in "logical channels." The logical channels typically are transmitted simultaneously on a single radio channel. Each logical channel includes an information signal that has been modulated by an orthogonal (or quasi-orthogonal) code, called the "channel code." The logical channels are summed to build an aggregate signal for transmission. When received, a CDMA receiver obtains the information signal from the logical channel by synchronously correlating the received aggregate signal with the channel code. Due to the correlation function, all other logical channels are reduced to low level noise and the channel code for the one logical channel cancels out. The information signal from the logical channel thus is retrieved. (CDMA systems are those referred to as "interference limited" systems since the signal process of the other logical channels may not completely cancel.)

CDMA systems may be deployed in spatial regions of varying scales. It is known to provide wireless CDMA local area networks ("LANs") within an office building. CDMA cellular systems, such as the known "IS-95" system, may be deployed on a city-wide or even nationwide basis. And CDMA satellite systems may provide global coverage.

In a cellular system, a spatial area may be divided into a plurality of cells, each with its own base station transmitter/receiver ("base station"). The base station communicates with one or more mobile stations ("mobiles" or "subscribers"). To distinguish the channels of one base station from the channels of another, the aggregate sum of logical channels for one base station are modulated by another code before transmission, called the "base station code." Among the base stations, the different base station codes are orthogonal or quasi-orthogonal. A cellular CDMA receiver may perform two correlation functions: A first correlation function isolates signals from a first base station from other base station signals that may have been received, the signals from the other base stations are reduced to low level noise. A second correlation function isolates signals from a first logical channel transmitted by the base station from other logical channels transmitted by that base station, as the signals from the other logical channels are reduced to low level noise. Finally, dispersive effects contribute to additional noise.

The capacity of a CDMA system is said to be "interference limited" because the low level noise generated by the other logical channels may disturb the quality of the information signal obtained from the one logical channel to which the receiver is "tuned." The amount of interference obtained from the other signals is directly related to the received power of those signals. Thus, many CDMA systems employ sophisticated power control techniques to limit unnecessary transmitted power of CDMA signal and avoid "cross-talk," the interference that a first logical channel assert on other logical channels.

Of course, a first logical channel must be transmitted with sufficient energy so that the information signal within may be retrieved therefrom. Thus, regardless of the interference that it may cause to other logical channels, a transmission from a base station to a distant subscriber, such as one that is on the edge between two cells, must be transmitted with sufficient power to convey intelligible information to the distant subscriber.

There is a need in the art for an improved interference mitigation scheme in a CDMA communication system that permits high power transmissions to be made for distant subscribers but also minimizes the total transmitted power in the system.

SUMMARY OF THE INVENTION

Embodiments of the present invention provide an interference mitigation method for a CDMA system in which subscribers that will receive a high power transmission generate an alert message to surrounding base stations. A surrounding base station, before it generates new transmissions, determines the distance between it and a second subscriber that will receive the new transmission. If the distance is greater than an interference threshold, the base station delays the new transmission until the first high-power transmission concludes. The method prevents two high-power transmissions from occurring simultaneously.

DETAILED DESCRIPTION OF A PREFERRED EMBODIMENT

The present invention provides an administrative technique in a CDMA cellular system having store and forward features. According to the present invention, when a message is to be transmitted to a distant subscriber in a first cell, the subscriber transmits a generally addressed message at high power. The subscriber's message may be received by other base stations, probably those in adjacent cells. Those base stations engage a message initiation protocol to delay transmission of any newly received message that is addressed to a second subscriber that is distant from the base station for a period of time corresponding to a probable length of the message addressed to the first subscriber. Thus, this message scheduling system prevents two high power CDMA signals from being transmitted simultaneously in neighboring cells.

Figure 1:
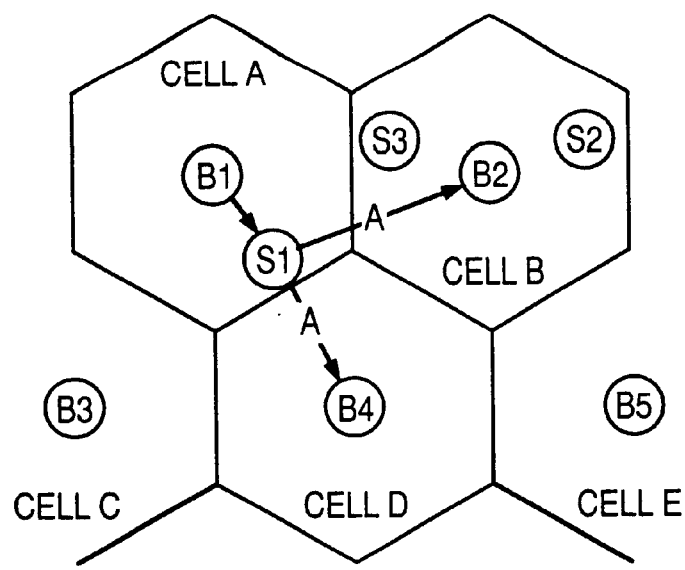
FIG. 1 illustrates a CDMA system suitable for use with the present invention.

FIG. 1 illustrates a CDMA cellular system suitable for use with the present invention. The CDMA system provides messaging services. That is, all or part of the information traffic that the system carries is made up of bursty, high data rate signals. Exemplary traffic includes page messages and packet data. Bursty traffic also may include downloaded computer information and even voice traffic where high rate information signals are transmitted from a transmitter to a receiver for a short period of time (say, 20 ms), then the information signal carries no information for an extended period of time (say, 1–5 sec.). The CDMA system includes a predetermined message length representing a maximum length of a message transmission. Information signals longer than the message length are transmitted over two or more message signals.

FIG. 1 illustrates several cells, CELLS A–E, each populated by a respective base station B1–B5. A subscriber S is shown within CELL A but proximate to the boundaries between CELL A and CELLS B and D. In the example of FIG. 1, base station B1 is an "originating base station;" it receives a message signal addressed to the distant subscriber S1.

Figure 2:
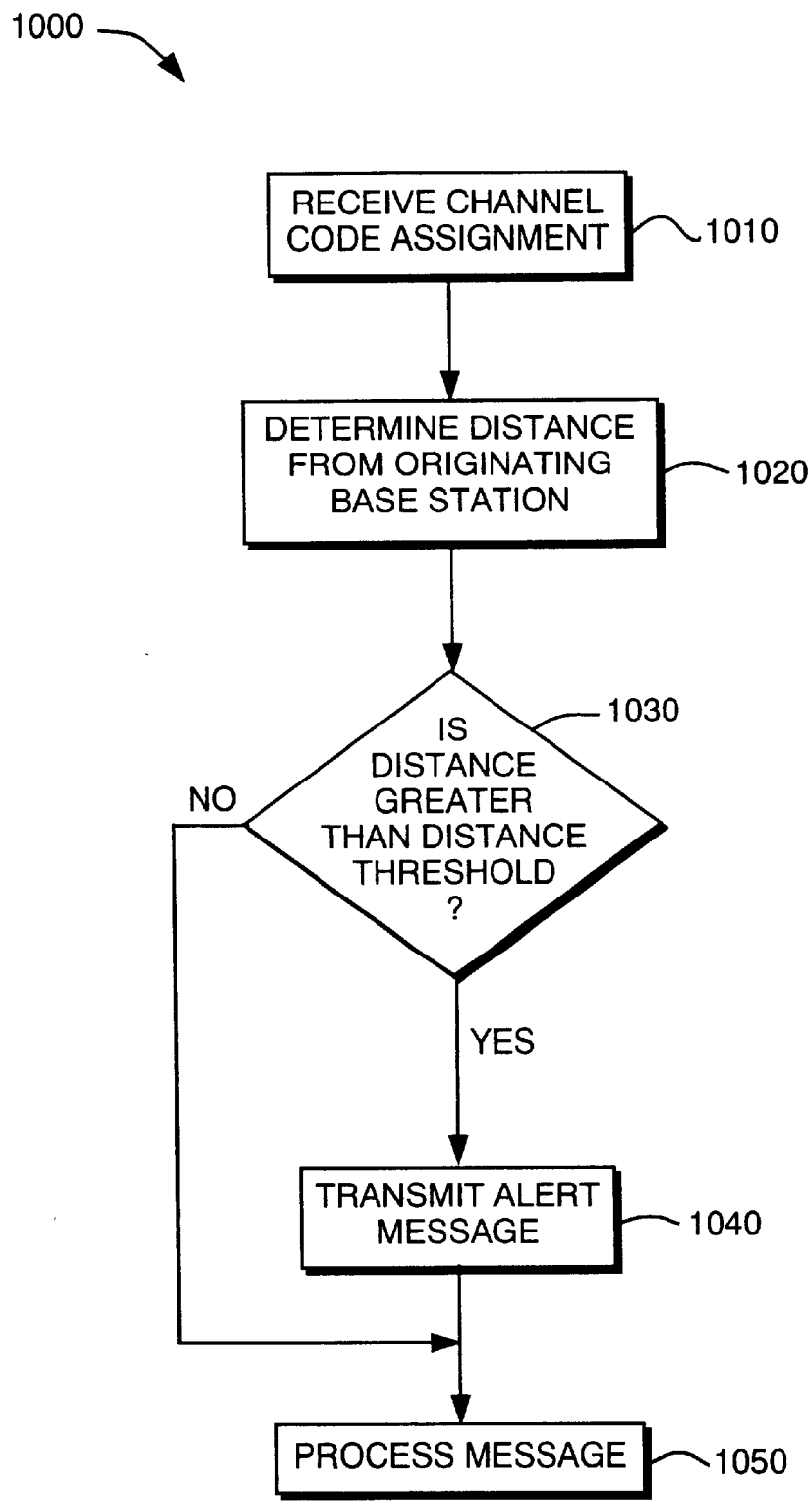
FIG. 2 is a flow diagram of a method of operation according to an embodiment of the present invention.

FIG. 2 is a flow diagram illustrating an operative method of the distant subscriber S1 according to an embodiment of the present invention. The communication link between the originating base station B1 and the distant subscriber S1 is established according to any of the known set up procedures applicable to CDMA systems. At some point in the set up procedure, the originating base station B1 assigns a channel code to the distant subscriber S1. The "channel code" is the orthogonal or quasi-orthogonal code that distinguishes the new logical channel from other logical channels that the originating base station B1 may be transmitting.

The distant subscriber S1 receives its channel code (Step 1010). When it does, the distant subscriber S1 determines its distance from the originating base station typically by measuring the strength of the signal received from base station B1 (Step 1020). The distant subscriber S1 tests the measured distance against a predetermined distance threshold (Step 1030) and, if the measured distance exceeds the distance threshold, the distant subscriber S1 transmits an alert message at high power (Step 1040). The alert message indicates that a high power message will be transmitted to the distant subscriber S1 imminently. Upon the conclusion of step 1040 or if the measured distance does not exceed the distance threshold, the distant subscriber S1 receives and decodes the logical channel according to conventional techniques (Step 1050).

According to an embodiment, the distant subscriber S1 transmits the alert message in an access channel. As is known in many CDMA systems, the "access channel" is a logical channel dedicated to control functions initiated by a subscriber. For example, CDMA systems that operate according to the IS-95 system provide an access channel that permits a subscriber to initiate a cellular call, to respond to messages from a base station when the base station initiates a cellular call or to register with a base station upon subscriber initialization.

Propagation of the alert message is shown in FIG. 1 with designation "A." In this example, the alert message is received by base stations B2 and B4 in CELLS B and D. It is not received by base stations 3 and 5 in CELLS C and E.

Figure 3:
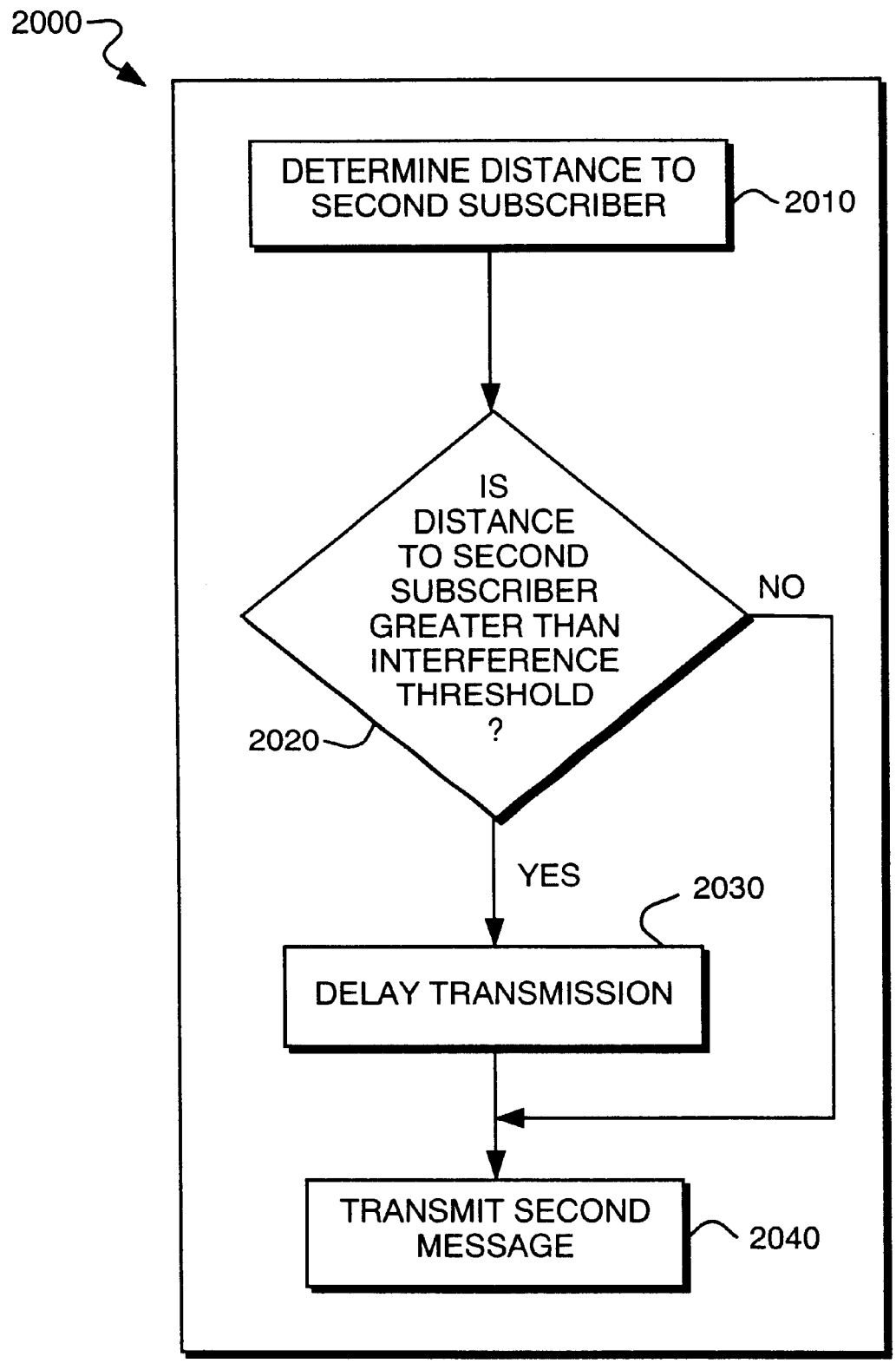
FIG. 3 is a flow diagram of a method of operation according to another embodiment of the present invention.

FIG. 3 illustrates a method of operation for a base station, such as stations B2 and B4 in FIG. 1, that receive an alert message from a distant subscriber S1. When the message is received, the base station (say, B2) initializes a delay timer (Step 2010). The delay timer counts out a time corresponding to the message length.

According to the present invention, if, before the delay timer expires, the base station B2 receives a new information signal to be transmitted to a subscriber (say, S2), the base station B2 determines the distance from base station B2 to the subscriber S2 (Step 2020). It compares the distance to an interference threshold distance (Step 2030) and, if the distance exceeds the distance thresholds, the base station B2 delays transmission of the message until the delay timer expires (Step 2040). When the delay timer expires or if, at step 2030, the distance did not exceed the distance threshold, the base station B2 sets up a communication link and transmits the new message to the subscriber S2 according to conventional techniques.

According to an embodiment of the present invention, the method 2000 of FIG. 3 may be implemented also by the originating base station B1. That is, it may inhibit a new message from being delivered to another subscriber (not shown) until the delay timer expires. Alternatively, however, the originating base station B1 may terminate the delay timer before its natural expiration if it determines that the actual message that it transmits to the distant subscriber S1 is shorter than the allowable message length.

The present invention prevents two high power messages from being transmitted simultaneously in the same cell or in neighboring cells. It preserves signal quality in the system by delaying a second high power signal until the first high power signal is concluded. In a store and forward CDMA system, where messages may be delivered in "near real time" rather than real time, such transmission delays are permissible.

Figure 4:
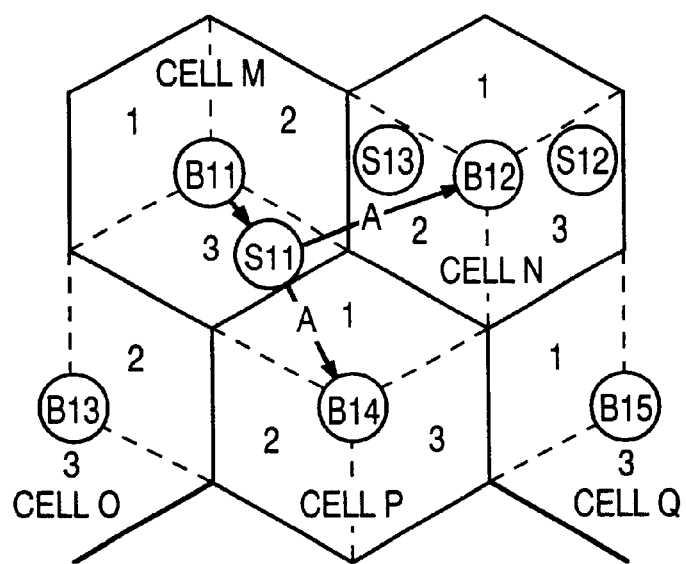
FIG. 4 illustrates another CDMA system suitable for use with the present invention.

FIG. 4 illustrates another CDMA system suitable for application with the present invention. As in FIG. 1, the CDMA system is populated by a plurality of cells, CELLS M–Q, each provided with its own base station B11–B15. A plurality of subscribers S11–S13 are shown. Subscriber S11 is provided within CELL M but proximate to CELL M's boundaries with CELLS N and P. Base station B11 is an "originating base station."

In the embodiment of FIG. 4, CELLS M–Q are sectored cells. As is known, base stations of a sectored cell contain directional antennae directed to subregions of the cells. Consequently, transmissions between a base station (say, B12) and a subscriber S12 in a first sector are isolated from transmission between the base station B12 and a subscriber S13 in a second sector. In the example of FIG. 4, each cell includes three sectors. Other sector divisions of a cell are known.

In this embodiment, a subscriber S1 may determine that it is a distant subscriber according to the method 1000 of FIG. 2. A base station B12 may perform the method 2000 of FIG. 4 individually for each sector. That is, base station B12 determines whether it has received the alert message in sector 1, sector 2 and/or sector 3. When a new message is to be established, a delay timer may have been engaged for one sector (say, sector 2 of CELL N) but not for other sectors (say, sectors 1 and 3 of CELL N). Thus, the base station B12 may determine to transmit the message (Step 2050) or delay the message (Step 2040) depending upon the sector in which the subscriber is located and the distance of the subscriber from the base station. The embodiment of FIG. 4 may permit two high power transmissions to occur simultaneously in adjacent cells but still maintains the average power in the system at a manageable level.

Compare the systems of FIGS. 1 and 4. In these two examples, subscribers S2 and S3 are illustrated as equidistant from base station B2 are in the same locations respectively as subscribers S12 and S13. In the embodiment of FIG. 1, where the base station B2 determines whether to transmit the new message solely based on the distance of the subscribers (S2 or S3) from the base station, the base station B2 would block new messages to both subscribers S2 and S3. By contrast, in the system of FIG. 4, if the base station B12 receives, in sector 2 but not sector 3 the alert message from subscriber S11, the base station may delay a new message addressed to subscriber S13 but not one addressed to subscriber S12. Accordingly, the present invention may provide greater message throughput when applied to a sectored cellular system as compared to a non-sectored cellular system.

According to an embodiment of the present invention, the transmitters and receivers of the present invention may be adapted for use with one or more of the following Telecommunications Industry Association interim standards: Interim Standard 95, "Mobile-Station Base Station Compatibility Standard for Dual-Mode Wideband Spread Spectrum Cellular System" (July 1993), Interim Standard 99, "Data Service Option Standard for Wideband Spread Spectrum Digital Cellular System" (July 1995), and/or Interim Standard 637 "Short Message Services for Wideband Spread Spectrum Cellular Services," (August 1996).

As shown, the present invention manages power levels in a store and forward CDMA system. The system does so by preventing two high power messages from being transmitted simultaneously in the same or adjacent sectors or in the same or adjacent cells. The present invention preserves signal quality in the system by delaying a second high power signal until the first high power signal concludes.

What is claimed:

1. An interference mitigation method for a CDMA system comprising, at a base station:
   receiving an alert message;
   engaging a delay timer;
   during the duration of the delay timer, when a new message is received:
      determining a distance from the base station to a subscriber addressed by the new message; and
      if the distance is greater than an interference threshold, delaying transmission of the message until the delay timer expires, and thereafter, transmitting the message to the subscriber.

2. The method of claim 1, wherein the determining step includes determining a level of transmitted messages from the subscriber to the base station.

3. The method of claim 1, wherein the delay timer counts out a length of time corresponding to a maximum length of messages transmitted by the CDMA system.

4. The method of claim 1, wherein the CDMA system is a cellular system.

5. The method of claim 1, wherein the CDMA system is a wireless LAN system.

6. The method of claim 1, wherein the CDMA system is a satellite system.

7. The method of claim 1, wherein the base station operates in a plurality of cell sectors and performs the method independently for each sector.

8. An interference mitigation method for a CDMA system including a plurality of base stations and a plurality of subscribers, comprising:
   at a first subscriber:
      receiving a transmission from an originating base station containing a logical channel assignment;
      determining the first subscriber's distance to the originating base station;
      if the first subscriber's distance to the originating base station exceeds a predetermined threshold, transmitting an alert message; at each base station that receives the alert message:
         engaging a delay timer, if, during the duration of the delay timer, a new message is received addressed to a second subscriber;
         determining a distance from the base station to the second subscriber, if the distance from the base station to the second subscriber exceeds an interference threshold; and
         delaying transmission of the new message to the second subscriber until the delay timer expires, and thereafter, transmitting the new message to the second subscriber.

9. An interference mitigation method for a CDMA system populated by base stations providing sectored cells, comprising:
   responsive to an alert message received on at least one sector, engaging a delay timer for the sectors on which the alert message was received;
   when a new message is received addressed to a subscriber;
      determining the one sector in which the subscriber is located;
      determining whether the delay timer is engaged for the one sector, and if the delay timer is engaged for the one sector,
      determining a distance from the base station to the subscriber;
      if the distance from the base station to the subscriber exceeds an interference threshold, delaying transmission of the new message until the delay timer expires; and
      transmitting the new message in the one sector.

10. The method of claim 9, wherein the delay timer counts out a length of time corresponding to a maximum length of non real time messages transmitted by the CDMA system.

11. The method of claim 9, wherein the CDMA system is a cellular system.

12. The method of claim 9, wherein the CDMA system is a wireless LAN system.

13. The method of claim 9, wherein the CDMA system is a satellite system.

14. An apparatus for interference mitigation in the CDMA system comprising:
   a receiver, located at a base station for receiving an alert message;
   a delay timer, being engaged upon receipt of the alert message;
   distance determining means, connected to a base station message receiver, for determining a distance from the base station to a subscriber unit addressed by a new message received during duration of the delay timer, and if that distance is greater than an interference threshold, delaying transmission of the message until the delay timer expires; and
   a transmitter for transmitting the message to the subscriber upon expiration of the delay timer.

15. An apparatus as in claim 14 wherein the means for determining a distance includes determining a level of transmitted messages from a subscriber unit to the base station.

16. An apparatus as in claim 14 wherein the delay timer additionally counts out a length of delay a length of time corresponding to a maximum length of messages transmitted by the CDMA system.

17. An apparatus as in claim 14 wherein the CDMA system is a cellular system.

18. An apparatus as in claim 14 wherein the CDMA system is a wireless LAN system.

19. An apparatus as in claim 14 wherein the CDMA system is a satellite system.

20. An apparatus as in claim 14 wherein the base station operates in a plurality of cell sectors.

* * * * *